(No Model.)
W. B. VAUGHAN.
SAW.
No. 529,538. Patented Nov. 20, 1894.
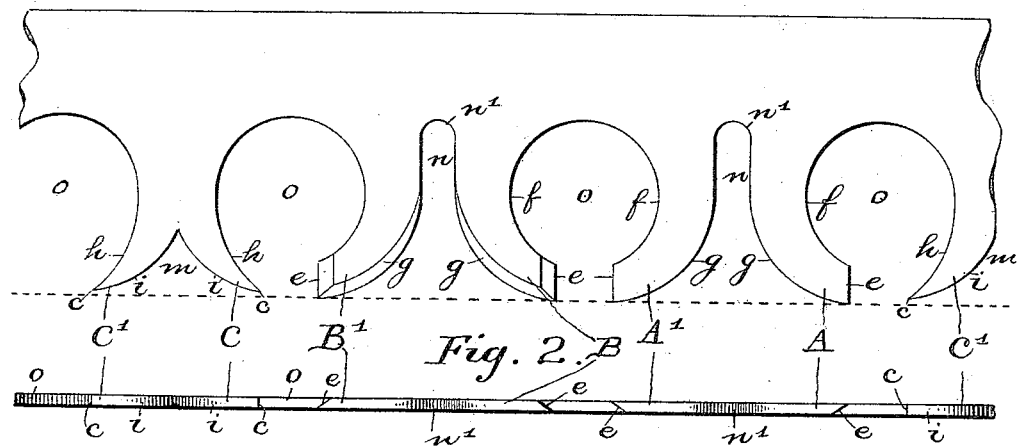
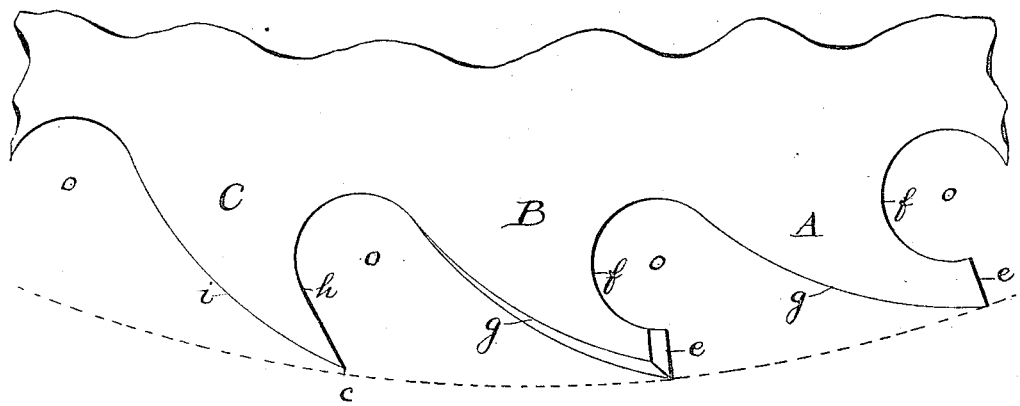
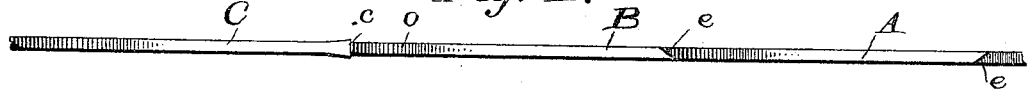
Witnesses:
Albert B. Blackwood
Carleton E. Snell
Inventor:
William B. Vaughan.
by J. H. Soulé & Co.
Attorneys.

UNITED STATES PATENT OFFICE.

WILLIAM B. VAUGHAN, OF OWENSVILLE, MISSOURI.

SAW.

SPECIFICATION forming part of Letters Patent No. 529,538, dated November 20, 1894.

Application filed September 15, 1893. Serial No. 485,615. (No model.)

*To all whom it may concern:*

Be it known that I, WILLIAM B. VAUGHAN, a citizen of the United States, residing at Owensville, in the county of Gasconade and State of Missouri, have invented certain new and useful Improvements in Saws; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to the teeth of saws, and consists in certain improvements in the form and arrangement of the teeth whereby they are made to cut more easily and the efficiency of the saw is largely increased, the improvements being especially designed for large saws such as are used in lumbering for cutting logs and boards.

The improvements are applicable with certain modifications to various styles of saws, and will be here shown and described as applied to a circular saw and to a cross-cut saw.

The drawings illustrate the blades of both a cross-cut saw and a circular saw embodying the improvements.

Figure 1, is a side view and Fig. 2 an edge view of the cross-cut saw. Fig. 3, is a side view and Fig. 4, an edge view of the circular saw. But fragmentary portions of the blades are shown, sufficient, however, to fully illustrate the formation and arrangement of the teeth.

Referring to Figs. 1 and 2, the cross-cut saw will be first described. In these figures, A, A', B, B', are the cutting teeth by which the cutting of the timber is principally effected, and C, C', are clearing teeth which keep the kerf free from saw-dust and chips. The teeth A, B, C, are brought into use when the saw is moved in one direction, and the teeth A', B', C', are brought into use when the saw is moved in the opposite direction, both sets of teeth being exactly alike in form and arrangement but facing in opposite directions, so that the cutting action is continuous during the reciprocation of the saw, as is usual in cross-cut saws. Each of the cutting teeth at its end is beveled on one side and straight on the other side, thus having a chisel-form cutting-edge *e;* but the teeth A, A', are beveled on the opposite side from the teeth B, B', so that the cutting edges of teeth A, A', occupy a plane different from but parallel with the plane of the cutting edges of teeth B, B', the distance between the two parallel cutting planes being of course equal to the thickness of the saw-plate or slightly greater if the teeth are given a lateral set. Consequently when the saw is used the teeth A (or A') cut in a straight line at one side of the kerf, and the teeth B (or B') cut in a straight line at the opposite side of the kerf. The beveled chisel-edge *e* of each cutting tooth is arranged perpendicularly to the line of cutting; that is, perpendicular to the timber being sawed or to the bottom of the kerf; but this perpendicular cutting edge extends only a fraction of the distance to the base of the tooth, and the front of the tooth inward from the cutting edge is deeply concave, as indicated at *f*. The rear edge *g* of each tooth is correspondingly convex, and this rear convex edge *g* is slightly beveled from the point of the tooth nearly to its base on the same side as the bevel of the cutting edge. The oppositely-beveled cutting teeth of each set alternate with each other, but the teeth A of one set are paired with the teeth A' of the other set, and the teeth B and B' are likewise paired, so that the teeth of each pair are beveled on the same side but the alternate pairs of cutting teeth along the blade are oppositely beveled, as illustrated in Fig. 1.

Following each two pairs of cutting teeth A, A', B, B', there is a pair of the clearing teeth C, C', one tooth (C) of the pair facing in the direction of cutting teeth A, B, and the other tooth (C') facing in the direction of cutting teeth A', B'. The clearing teeth are not beveled at all laterally, but the concave front edge *h* and convex rear edge *i*, of each clearing tooth meet at the point of the tooth and form the narrow blade *c* extending transversely of the saw-plate and in a plane perpendicular to the planes of the cutting edges *e* of the cutting teeth. The clearing teeth, like the cutting teeth, are curved forward in their direction of cutting, and the clearing blades *c* are therefore presented to the work at an angle considerably removed from the perpendicular. The clearing teeth C, C', may be made a trifle shorter than the cutting teeth A, A', B, B', that is, the points or blades c of the clearing teeth may be located a little above the plane (see dotted line, Fig. 1) of the lowest points of the cutting teeth, so that in sawing the points of the clearing teeth will not strike the hard wood before it has been cut and loosened by the cutting teeth. The clearing teeth C C' of each pair are separated for about half their length by the notch or crotch m, the angle of which is formed by the meeting of the adjacent convex edges i of the teeth. It will be seen that there is one clearing tooth for each two cutting teeth of each set, so that in both sets there is first a beveled cutting tooth A (or B'), then an oppositely-beveled cutting tooth B (or A'), and then a clearing tooth C (or C'), every tooth of one set being paired, back to back, with its corresponding tooth of the other set.

Between the adjacent convex edges g of each pair of cutting teeth A, A', or B, B', there is formed the deep slot n separating the teeth from point to base and having a rounded extremity n'. The front concave edges of the cutting teeth and of the clearing teeth C, C', form between the adjacent pairs of cutters and between the cutters and the clearers the circular spaces or cavities o. By means of the cavities o and slots n each cutting tooth is entirely separated from the rest, the successive pairs of teeth being separated by the large circular cavities o and the two teeth of every pair being as distinctly separated by the deep, narrow slots n. The two clearing teeth of each pair are likewise separated at their working ends by the notches m. It will be noticed that the front and rear edges of all the teeth of the saw are smoothly and regularly curved throughout the whole distance from the cutting edge or blade to the base of the tooth, and the meeting edges of adjacent teeth blend smoothly together, so that apart from the sharpened cutting edges themselves there are no corners or angles to produce friction and interfere with the easy movement of the saw. The front and rear edges of each cutting tooth back of the cutting-edge e are parallel or nearly so for a considerable distance, so that the outer portion of each cutting tooth is of uniform width equal to the length of the cutting-edge e, which gives the teeth the smallest practicable surface area and minimizes friction.

The operation is evident. When the saw is moved in one direction, the oppositely-beveled teeth A B cut the wood from the opposite walls of the kerf and the clearing teeth C take up the loosened chips or fragments and carry them off out of the path of the following cutters. The blades c of the clearing teeth do not merely scrape out saw-dust from the kerf, but they cut or dredge out the material left between the paths of the parallel cutters A B. When the saw is moved back in the reverse direction, the cutters A', B', and clearers C', operate in an exactly similar manner. The front concave or receding faces h of the clearing teeth provide inclines up which is forced the material collected by the clearing teeth. The capacious circular cavities o as well as the slots m and n supply abundant space for receiving and carrying out the saw-dust or wood-fragments. Not only are the cavities o of substantially circular form, but also the inner ends n' of slots n are cut to the form of a semi-circle, the rounded walls of the cavities preventing any wedging of the chips and insuring their free dropping out as they are carried beyond the ends of the kerf. The isolation of each cutting tooth by the surrounding spaces or cavities, and the position of the cutting edges e just in front of or below the roomy concavities o, insure the perfect freedom of the cutting edges from any accumulation of the loosened saw-dust or chips, thus greatly easing the operation of the saw. The cutting edges e, being perpendicular to the line of cutting and parallel with the walls of the kerf, pare off the wood smoothly on both sides and make a clean, smooth cut. Each perpendicular cutting edge strikes the material squarely and directly, all parts of the blade coming simultaneously into contact with the wood. The action of the cutting edges e and clearing blades c during the sawing operation is equivalent to the co-operation of two sets of chisels working at right angles to each other, the cutting edges cutting down the sides of the kerf vertically, and the blades c following and chiseling down the ridge of material between the two parallel cuts made by the cutting edges.

The beveled convex edges g of the cutting teeth assist in easing the passage of the saw through the wood by keeping the walls of the kerf smooth, extending as they do practically to the top of the slots n considerably above the short cutting edges e. Since the cutting edges e are perpendicular to the line of cutting, the extremity of each cutting tooth just back of the cutting edge comes in contact with the bottom of the kerf, and at these extreme points of the cutting teeth the bevels g, oppositely inclined on alternate teeth, have the special function of forcing the saw-dust or chips inward from the walls of the kerf so as to be more readily and certainly removed by the clearing teeth; also friction is thereby prevented at the points of the teeth back of the cutting edges, because if the extremities of the teeth were not so beveled there would be more or less friction occasioned by the rubbing of the teeth against the detached wood-particles at the bottom of the kerf.

The described formation of the teeth is thoroughly calculated to make the operation of the saw easy and satisfactory in every respect. A cross-cut saw made in accordance with this invention cuts rapidly without any perceptible friction or clogging, the plate is never heated by excessive friction as in the case of saws of ordinary pattern, and there is but little waste of timber. The cuttings are almost entirely in the form of shavings or fragments of considerable size, with but little dust.

Figs. 3, and 4, of the accompanying drawings show the application of the improvements to a circular saw. Since the circular saw cuts continuously in one direction, but one set of teeth is required instead of the paired sets of the cross-cut saw. The teeth of the circular saw are designated in the drawings by the same reference letters as are used to designate the corresponding teeth of one of the sets of the cross-cut saw, A, B, being the oppositely-beveled cutting teeth alternating around the saw-plate, and C the clearing teeth one of which is introduced to follow each two cutting teeth A B. The teeth of the circular saw have the same characteristic features already described with reference to the cross-cut saw, namely, the perpendicular, chisel-edged cutting blades $e$, concave front edges $f$ and convex beveled rear edges $g$ of the teeth A, B, and the transverse clearing blades $c$ of teeth C which (as illustrated) describe a circle just inside of the outer sweep (see dotted line, Fig. 3) of the cutting edges $e$. The perpendicular cutting edges $e$ must in this case extend radially, which brings each blade squarely to its work, just as in the case of the cross-cut saw.

The extremities of the clearing teeth C are swaged or spread laterally in the circular saw, thus slightly increasing the width of the clearing blades $c$. This insures the complete clearing of the kerf of all dust and chips, which is quite essential in the rapidly-rotating circular saw. The swaged clearing teeth are illustrated in Fig. 4.

Fig. 3, shows the front edge of the clearing tooth inclined backward in a substantially straight line for some distance from the clearing blade and then curved smoothly around to merge into the rear edge of the next preceding tooth. Though not actually curved throughout its extent, the front edge of the clearing tooth taken as a whole may be described as being smoothly concave in this instance as well as in the case of the clearers in the illustrated cross-cut saw or in the case of the cutting teeth in both saws. The material fact is that in any case both front edge and rear edge of each tooth of the saw extend in smooth lines to the meeting edges of the next adjacent teeth.

In the circular saw the cavities $o$ are formed between the concave front edge of one tooth and the convex rear edge of the next preceding tooth, instead of by the concavities of two oppositely-facing teeth as in the cross-cut saw. Moreover, there being in the circular saw no pairs of oppositely-facing teeth, there are consequently no spaces corresponding to the slots $n$ and notches $m$ of the cross-cut saw.

The circular saw embodying the present improvements possesses all of the advantages specified in connection with the cross-cut saw, and the arrangement of teeth is much simpler because only one set of cutting and clearing teeth is required. The circular saw therefore exemplifies the main features of the invention in their simplest form.

I do not limit myself to all the details which have been illustrated and described. The exact form of teeth illustrated I find particularly efficient for cutting logs, &c., across the grain of the timber. For some kinds of sawing certain alterations in the precise form and proportions of the teeth or in their arrangement may be desirable and any such altered forms are included within the scope of the present invention in so far as they embody any of the essential characteristic features of novelty herein set forth and claimed.

I claim as my invention—

1. A saw having cutting teeth, each of which has a short cutting edge $e$ substantially perpendicular to the line of cutting, and back of said cutting edge the smooth concave front edge $f$ and smooth convex rear edge $g$ which start backward in approximately parallel curves from the extremities of said cutting edge, substantially as set forth.

2. A saw having oppositely-beveled cutting teeth with short vertical cutting edges $e$, and interposed clearing teeth with short transverse clearing blades $c$, each of said cutting and clearing teeth having a concave front edge and a convex rear edge which extend smoothly backward from the cutting edge or blade to the meeting edges of the adjacent teeth, substantially as set forth.

3. A cross-cut saw having the pairs A, A', and B, B', of oppositely-cutting teeth arranged back to back and having short vertical cutting edges, the front of each tooth being concave inward from its cutting edge so as to form the circular cavities $o$ between the pairs, and each tooth having a long convex rear edge forming the deep slots $n$ between the paired teeth, the walls of said cavities $o$ and slots $n$ extending in unbroken lines from one cutting edge to the next cutting edge, substantially as set forth.

4. In a saw, cutting teeth each having a short vertical cutting blade at its forward extremity, a smooth concave front edge extending inward from said cutting blade, and a long convex rear edge beveled from point to base, substantially as set forth.

In testimony whereof I affix my signature in presence of two witnesses.

WILLIAM B. VAUGHAN.

Witnesses:
WILLIAM R. VAUGHAN,
GEO. H. BUSCHMAN.